United States Patent

Figueroa et al.

[11] Patent Number: 5,280,457
[45] Date of Patent: Jan. 18, 1994

[54] POSITION DETECTING SYSTEM AND METHOD

[75] Inventors: Jorge F. Figueroa, New Orleans; Enrique Barbieri, Metairie, both of La.

[73] Assignee: The Administrators of the Tulane Educational Fund, New Orleans, La.

[21] Appl. No.: 923,709

[22] Filed: Jul. 31, 1992

[51] Int. Cl.$^5$ ............................................. G01S 15/00
[52] U.S. Cl. ................................... 367/127; 367/907; 367/902
[58] Field of Search ............... 367/118, 124, 127, 129, 367/902, 907

[56] References Cited

U.S. PATENT DOCUMENTS

| | | | |
|---|---|---|---|
| 3,115,615 | 12/1963 | Saper . | |
| 3,821,469 | 6/1974 | Whetstone et al. | 178/18 |
| 3,924,450 | 12/1975 | Uchiyama et al. | 73/67 |
| 4,012,588 | 3/1977 | Davis et al. | 178/18 |
| 4,124,838 | 11/1978 | Kiss . | |
| 4,176,337 | 11/1979 | Aechter et al. | 367/131 |
| 4,357,672 | 11/1982 | Howells et al. | 364/561 |
| 4,752,917 | 6/1988 | Dechape | 367/125 |
| 4,862,152 | 8/1989 | Milner | 340/712 |
| 4,891,474 | 1/1990 | Kelly | 178/18 |
| 4,924,450 | 5/1990 | Brashear et al. | 367/118 |
| 4,956,824 | 9/1990 | Sindeband et al. | 367/129 |
| 4,973,800 | 11/1990 | Sindeband et al. | 178/18 |
| 4,991,148 | 2/1991 | Gilchrist | 367/124 |
| 5,009,277 | 4/1991 | Sindeband et al. | 178/18 |
| 5,043,950 | 8/1991 | Schorum et al. | 367/98 |

FOREIGN PATENT DOCUMENTS 63-117284 5/1988 Japan .

OTHER PUBLICATIONS

J. F. Figueroa and J. Lamancusa, *A Method for Accurate Detection of time of Arrival: Analysis and Design of an Ultrasonic Ranging System* (1991).

F. Figueroa and E. Barbieri, *An Ultrasonic Ranging System for Structural Vibration Measurements*, in IEEE, Trans. on Instr. and Measurement, vol. 40, No. 4 (Aug., 1991).

E. Barbieri and F. Figueroa, *Experiments on Identification and Control of Flexible Structures Using an Ultrasonic Ranging System*, in IEEE, Inter. Conf. of System Engr. (Aug., 1990).

F. Figueroa and E. Barbieri, *Increased Measurement Range via Frequency Division in Ultrasonic Phase Detection Methods*, in Acustica, vol. 73 (1991).

Primary Examiner—Daniel T. Pihulic
Attorney, Agent, or Firm—Olson & Hierl, Ltd.

[57] ABSTRACT

A detecting system and method of determining the position of a mobile point of interest in a m dimensional coordinate system having an ultrasonic transmitter mounted on the point of interest, and a plurality of stationary ultrasonic receivers, the number being at least m plus 2. The location of the receivers are determined optimally by using a linear matrix formulation. Alternatively, the location of the receivers can be determined during installation or self-calibration of the system. The system also includes receiver controlling means for processing the received signal to generate time of flight measurements which are used to eliminate the speed of sound as a variable and to compute the location of the point of interest. The controlling means also generates phase measurements when prompted by an outside source by comparing the transmitted signal with a 40kHz pulse sync to refine the accuracy of the location of the point of interest.

23 Claims, 6 Drawing Sheets

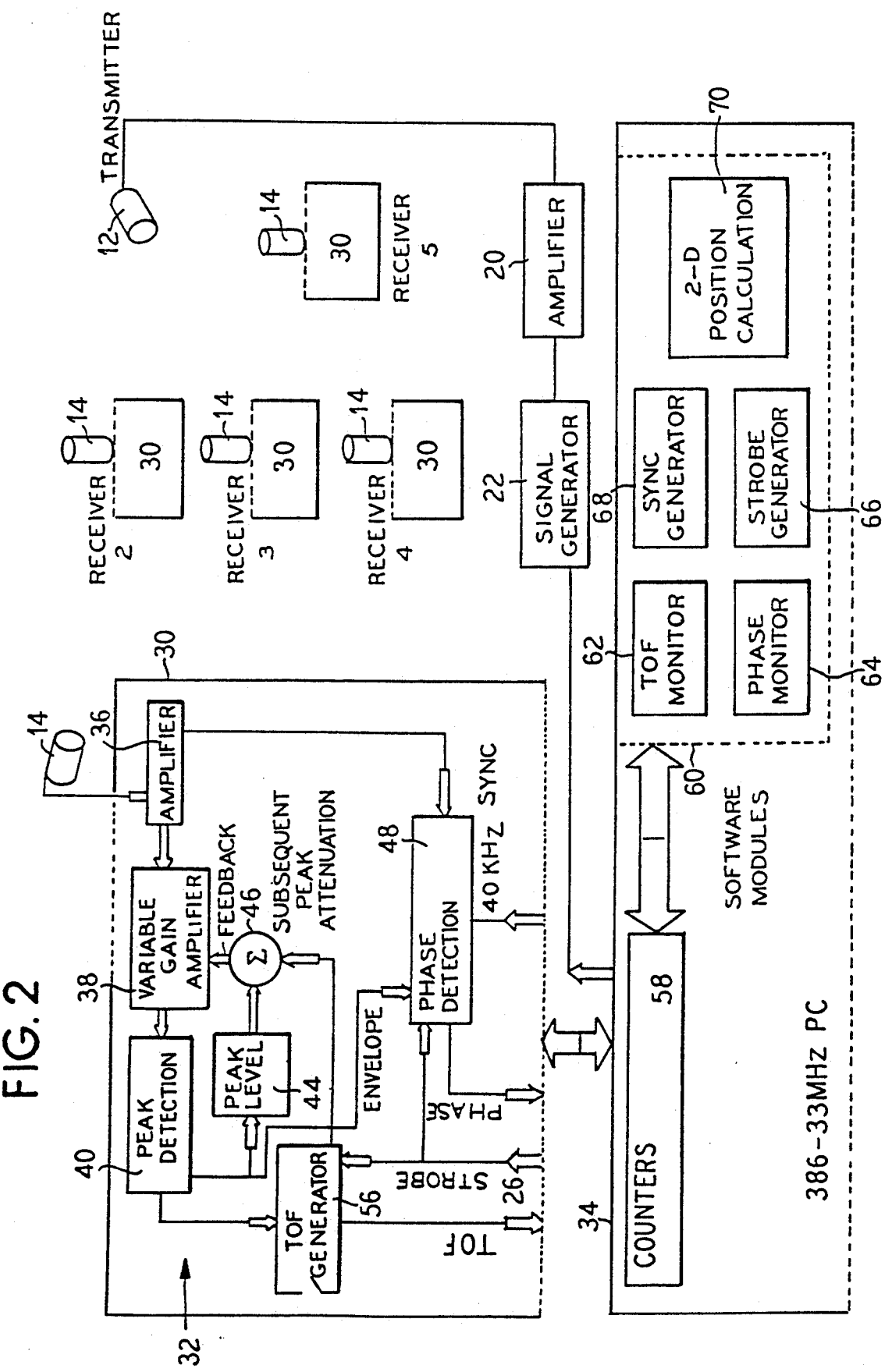

RECEIVED SIGNAL PRIOR TO AGC

RECEIVED SIGNAL AFTER AGC

TYPICAL SIGNAL WITH REFLECTION

RELATIVE ATTENUATION OF REFLECTED SIGNAL

POSITION DETECTING SYSTEM AND METHOD

FIELD OF THE INVENTION

This invention relates to a method and system for determining the position of a point of interest and more particularly to a system providing inherent self-calibration.

BACKGROUND OF THE INVENTION

Numerous types of position detection systems are well known in the prior art. Generally, these systems are configured to use techniques employing a single transmitter and multiple receivers, estimating geometric distances by the transmit-receive mode of ranging, to measure the position of a target point. Most ultrasonic systems are of the pulse-echo type and use highly directional transducers that are pointed toward the target point to measure the position and distance of the target point. With this technique, the distance between a transmitter and a receiver is determined indirectly by measuring the elapsed time, usually called the time of flight (TOF), during which the signal generated at the transmitter hits the receiver and bounces back to the transmitter. This ranging technique is used mostly to measure distances in one dimension along the line perpendicular to the transducer surface.

The most popular pulse-echo type system was built by Polaroid which was designed to provide the distance from a camera to the picture subject for the purpose of focusing a lens. However, pulse-echo systems are not very accurate because different reflection properties of the targets affect the accuracy of the TOF. In addition, ultrasonic beams spread as they travel away from the transmitter, thus these systems are unable to effectively point to a small target.

Acoustic ranging systems for applications in two-dimensional and three-dimensional space are produced commercially by a few manufacturers. These products use transducers operating in the transmit-receive mode primarily for digitization applications. The coordinates of a transmitter are calculated from its distance to various receivers located outside the operating volume of the digitizing unit. The distances are determined by measuring the TOF of the ultrasonic pulse as it travels from the transmitter to each receiver. Calculation of the coordinates of the transmitter from these distances is done using a simple triangulation operation.

For example, U.S. Pat. No. 4,991,148 issued to Gilchrist discloses a three-dimensional acoustic digitizing system employing two transmitters and four receivers to determine the position of a target point. A different technique was employed in U.S. Pat. No. 4,862,152 issued to Milner. In Milner, the distance between a transmitter and several receivers were determined using a transmitter responsive receiver frame, a plurality of fixed receivers, and a controller port plug which provides a computer with position signals.

The accuracy of the sonic sensors used in these systems and their response to the changes in the speed of sound has generated much concern. The deterministic effects of the speed of sound in an environment is caused by changes in temperature and humidity, and by air turbulence. For accurate measurements, the speed of sound must be known at all times and the path travelled by the signal must be linear. Because it is difficult to maintain an homogenous environment within a given work area, calibration techniques have been devised. The most common technique employed has been to estimate and to average time of flight measurements.

Gilchrist discloses the use of a reference correction transmitter and a scale correction technique to compensate for the changes in the speed of sound while calibrating the system. One disadvantage of this and similar techniques is that they require a separate transmitter to account for the changes in the speed of sound. Other disadvantages include requiring a controller device to determine the distance between the transmitters and receivers, and a reference receiver with dedicated circuitry to correct for the changes in the speed of sound.

Another technique used to increase the accuracy of the distance of a target point includes calculating the phase shift between the transmitted and received signals. Such a method is disclosed in U.S. Pat. No. 4,752,917, issued to Dechape. Dechape discloses a phase measurement technique that compares the phase of the transmitted signal to the phase of the received signal, and combines this resultant signal with rough time of flight measurements to refine the position of a target point. While Dechape seems to have solved part of the accuracy problem, it does not account for changes in the speed of sound or the speed of sound's deterministic effects on the accuracy of the position of the target point.

Accordingly, what is needed is a detection means and method which provides an inherent self-calibration technique that eliminates the speed of sound as a necessary variable, while determining the coordinates of a point of interest in an m-dimensional coordinate system. The present invention meets these needs.

SUMMARY OF THE INVENTION

The present invention relates to a position detecting system and method which provides an inherent self-calibration technique that eliminates the speed of sound as a necessary variable while determining the coordinates of a point of interest in an m-dimensional coordinate system.

The system comprises an ultrasonic transmitter, mounted on a mobile point of interest in an m-dimensional coordinate system for transmitting a periodic sound, and a plurality of ultrasonic receivers, optimally placed within the coordinate system wherein the number of receivers are at least m plus two for receiving the sound transmissions. For example, in a three-dimensional system, five receivers are used. The system also includes analyzing means operably associated with each receiver to generate measurements relating to the distance between the transmitter and each receiver. Analyzing means uses these measurements to eliminate the speed of sound as a necessary variable, and to identify the location of the point of interest. The analyzing means preferably includes a controlling means and a computing means. The controlling means generates time of flight measurements relating to the time between transmission of the sound and reception of the sound by respective receivers indicative of their respective distances. The computing means processes the distance measurements to eliminate the speed of sound as a variable and to compute the location of the point of interest.

Also provided is a method using linear matrix formulation to optimally configure the location of the receivers within the coordinate system.

In the preferred operation, a strobe is generated and sent by the strobe means to the transmitter whereby a sound is transmitted by a transmitter associated with a point of interest in three-dimensional space. The sound is received by each receiver and processed by the controlling means to generate time of flight information, which is sent to the computing means to compute the position of the point of interest.

The system also preferably includes the ability to determine the phase shift between the transmitted and received sounds, and to combine the determined phase shift with time of flight measurements to refine the accuracy of the position of the point of interest. Specifically, a strobe is sent by the strobe means to both the transmitter and the controlling means to initiate a sound transmission and to inform the controlling means when a sound transmission has been made, respectively. A pulsed sync is sent to the controlling means for comparison with the sound transmission received by the analyzing means to determine the phase shift of the sound transmission. Thereafter, the phase shift and the time of flight measurements are combined by phase detection means of the controlling means to determine with greater accuracy the position of the point of interest.

Another benefit of the present invention is to provide a method for determining the optimum configuration for the locations of m plus 2 receivers.

Other advantages and benefits of the features of the present invention will be apparent to those skilled in the art from the following detailed description of a preferred embodiment of the invention.

BRIEF DESCRIPTION ON OF THE DRAWINGS

FIG. 2 is a system block diagram of the present invention;

DETAILED DESCRIPTION OF THE INVENTION

Figure 1:
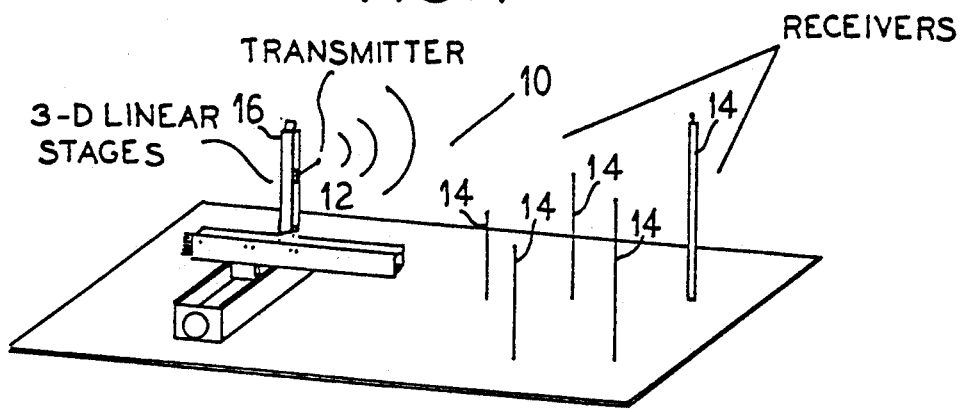
FIG. 1 is a system diagram of the present invention showing a transmitter and a plurality of receivers in a coordinate system.
Figure 4:
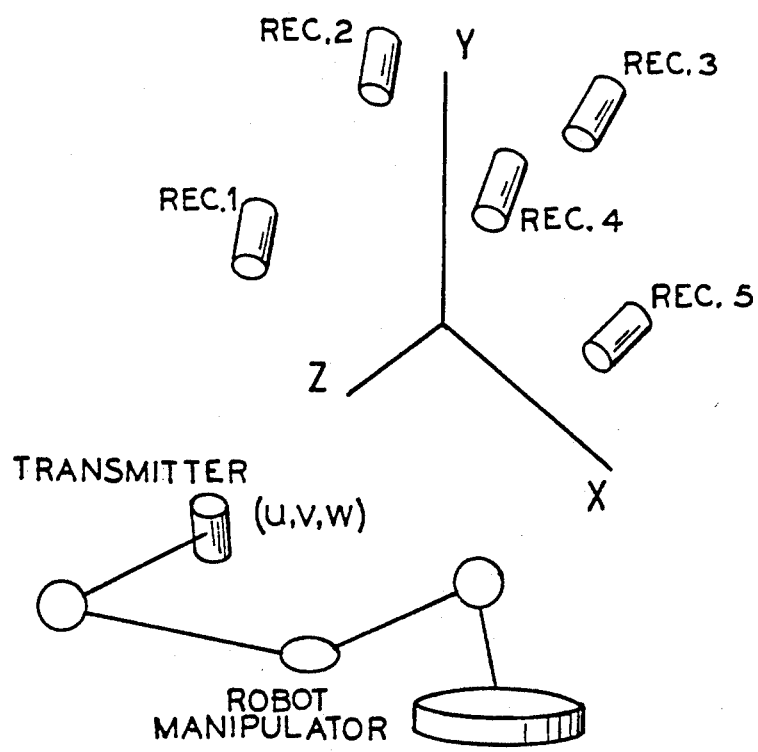
FIG. 4 is a system diagram of the present system configured for use for tracking an end effector of a robotic manipulator.

Referring now to FIG. 1, a three-dimensional coordinate system is shown containing the present position detecting system 10. The system 10 is an ultrasonic ranging system (URS) comprising an ultrasonic transmitter 12 and preferably five optimally positioned ultrasonic receivers 14. The transmitter and receivers are preferably 40kHz ultrasonic transducers manufactured by Massa Corporation and have a wide beam operating cone of 90 degrees for greater receiving and transmitting ranges in the coordinate system. As seen in FIG. 1, transmitter 12 is mounted on a point of interest 16 that is mobile in all directions within the coordinate system. The point of interest 16 can be an end-effector of a robot manipulator as seen in FIG. 4 or an autonomous guidance vehicle as described below.

The receivers 14 are fixed to an inertial frame of reference throughout the coordinate system and particularly positioned thereon to obtain an optimum receiver configuration. During reception of the sound by each receiver 14, the sound, an ultrasonic sound wave, generates pressure vibrations on each receiver 14 which converts the sound into an electrical pulse signal (hereinafter also referred to as sound). The sound is then amplified by amplifiers connected to each receiver and processed to provide time of flight (TOF) measurements. As commonly known, many different waveforms may be used to measure the TOF of a signal. The most widely used waveforms are sinusoidal waves, square waves of various widths, and frequency and amplitude modulated waveforms. The waveforms preferred for use in the present system is a sinusoidal burst or pulse of short duration.

FIG. 2 is a system block diagram of the present invention showing a first amplifier 20 connected to the output of signal generator 22 which provides a signal that initiates a sound to be transmitted in the coordinate system. First amplifier 20 is connected to a signal generator 22 and transmitter 12 to provide an amplified signal to the transmitter 12 which is transmitted and received by receivers 14. Not shown is strobe means which is operably connected to the signal generator 22 and analyzing means 30 for supplying the transmitter with a strobe 26 to initiate the transmission of the sound and to provide the analyzing means 30 with an indication of when the sound is transmitted.

Operably associated with each receiver 14 is an analyzing means 30 to generate measurements relating to the distances between the transmitter and each receiver, and to use these measurements to eliminate the speed of sound as a necessary variable. As can be seen below, the speed of sound is indirectly measured and eliminated from the calculations as a variable that must be known. Analyzing means 30 also identifies the location of the point of interest 16. The analyzing means 30 includes a controlling means 32 and a computing means 34. The controlling means 32 generates TOF measurements relating to the time between transmission of the sound and reception of the sound by respective receivers indicative of their respective distances. The computing means 34 processes the distance measurements to eliminate the speed of sound as a variable and to compute the location of the point of interest.

In the alternative embodiment, the number of controlling means 32 used in the system equals the number of receivers 14 and each controlling means 32 is connected to strobe means 28 and its own dedicated receiver 14 for processing the received sound and for generating distance measurements. As in the preferred embodiment, computing means 34 is operably associated with each controlling means 32 for using measurements of the distance between the transmitter and each receiver to eliminate the speed of sound as a variable and to compute a location of the point of interest.

Analyzing means 30 also includes a second amplifier 36 for amplifying the received sound before signal processing and a variable gain amplifier 38 for further amplification before being detected by peak detection means 40. The identification of the "correct" sound is accomplished by amplifying the maximum amplitude of the received signal and by attenuating subsequent reflected signals in the coordinate system until the analyzing means 30 is reset by another sound transmission.

Figure 3:
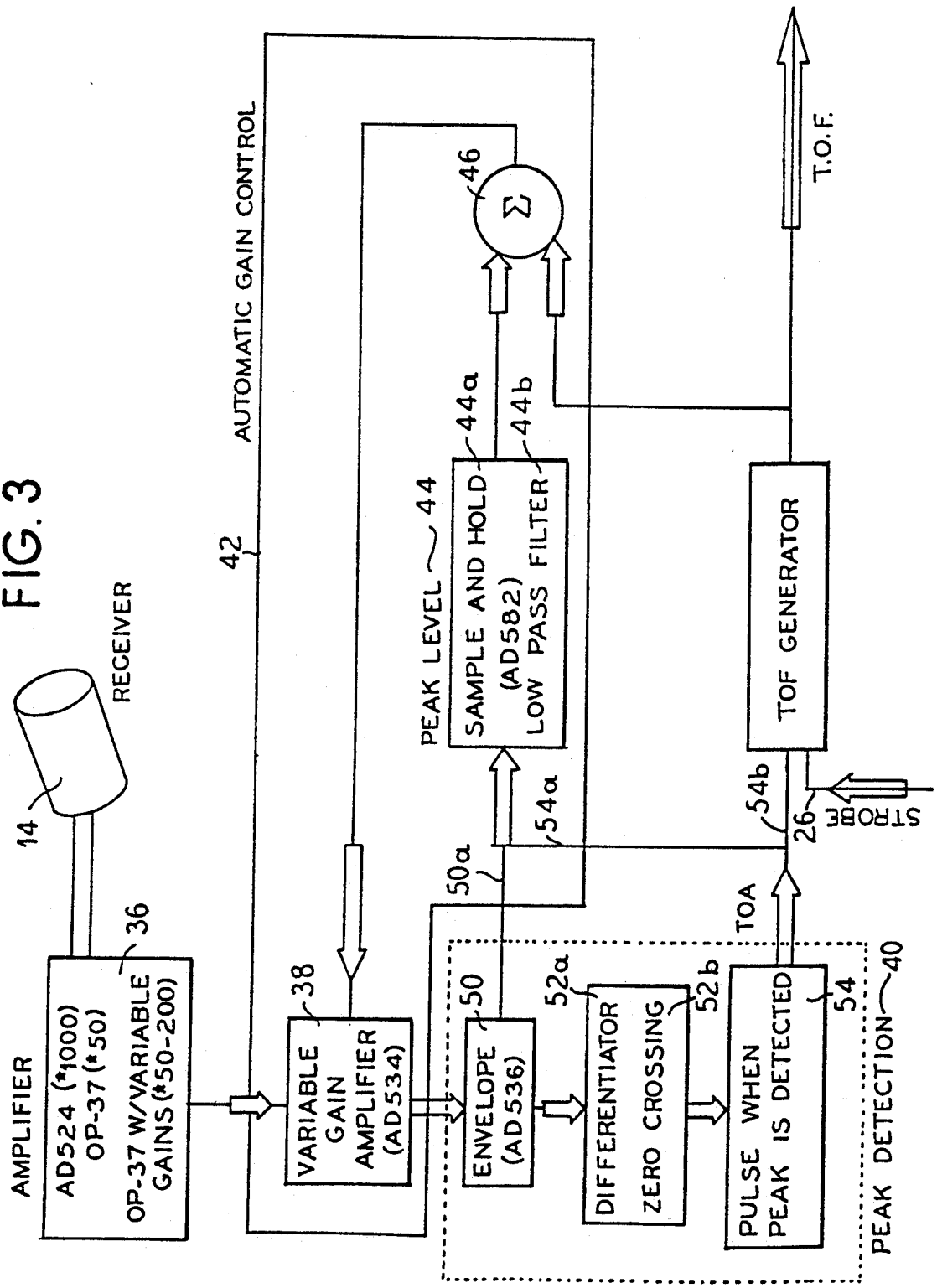
FIG. 3 is a block diagram detailing an analyzing means of the present invention.

The automatic gain controller 42 as shown in FIG. 3 performs a signal processing technique used by the system 10 to assist in identifying the correct sound. The automatic gain controller 42 takes feedback from peak level device 44 to provide consistent quality of the shape of the envelope of the received signal for accurate signal processing, and for increasing the range of measurable distances between the transmitting and receiving transducers 12 and 14, respectively.

More particularly, the automatic gain controller 42 tries to maintain the magnitude of the amplified amplitude at a desired value. This desired value is decreased by adding the TOF pulse to it, effectively attenuating the signal immediately after the peak is detected. The automatic gain controller 42 includes a variable gain amplifier 38, peak level device 44, and a summer 46 as shown in FIGS. 2 and 3.

Figure 5A:
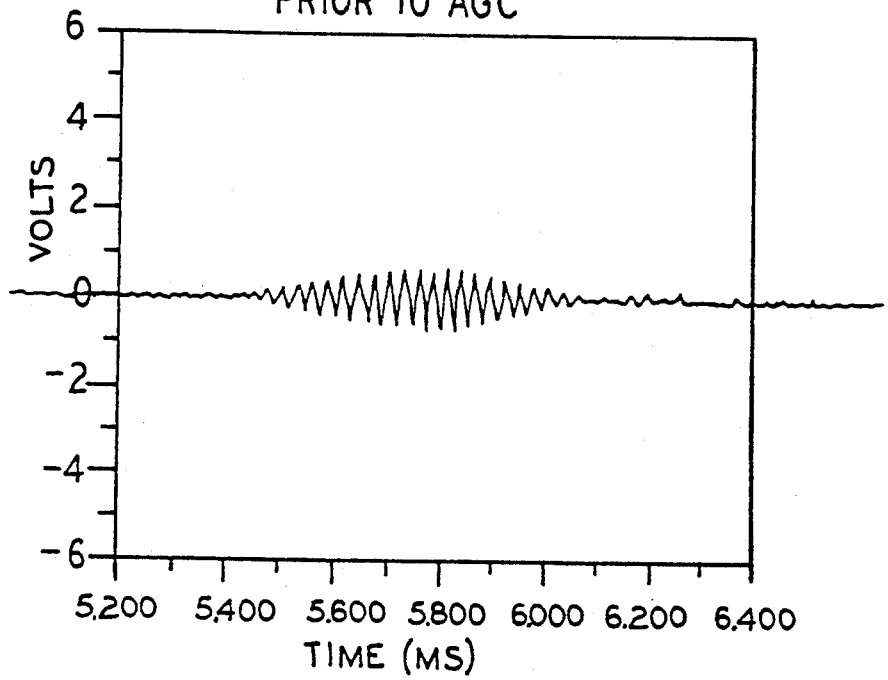
FIGS. 5A and 5B are illustrations of a received signal before and after automatic gain control processing.
Figure 5B:
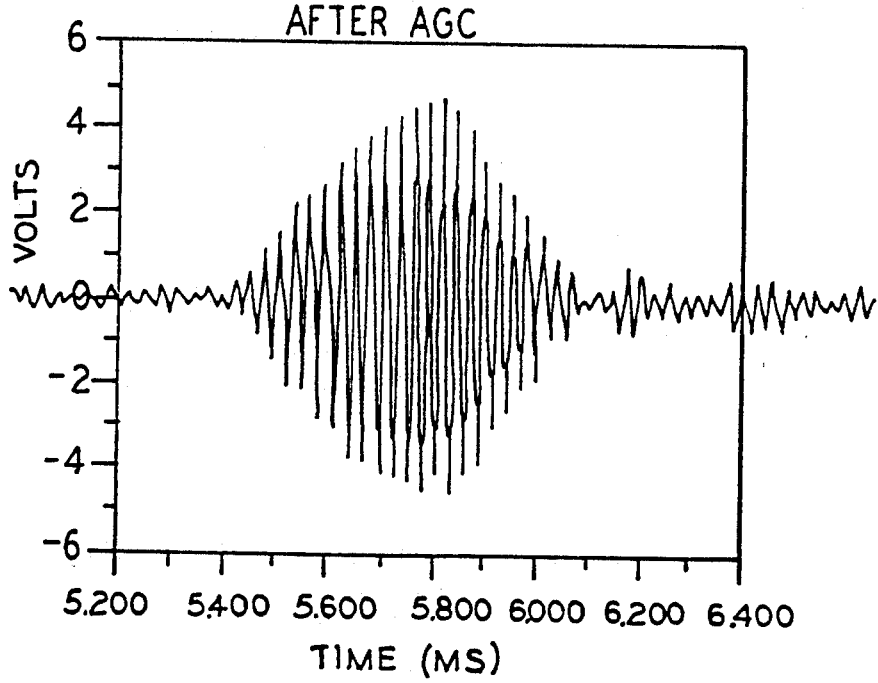

The advantages of using the automatic gain controller 42 are shown in FIGS. 5A and 5B. The sound received by receivers 14 is usually too weak to process, and occasionally yields unreliable signal information. Even though a stronger signal could be achieved by adjusting the variable gain amplifier 38 of the analyzing means 30, reliable processing over a long range remains at a minimum. However, by using automatic gain controller 42, effective sonically measurable displacements are increased and reliably measured. Automatic gain controller 42 also enables reliable processing for misalignment angles up to ±40 degrees between the transmitter and any given receiver. The variable gain amplifier 38 can be adjusted by increasing the feedback value to vary the amplitude in order to selectively allow detection of signals having different amplitudes. In other words, the variable gain amplifier tries to amplify its input to equal a reference value.

The peak level device 44 includes a sample and hold circuit 44a and low pass filter 44b as shown in FIG. 3. The sample and hold circuit 44a samples in response to the time of arrival (TOA) pulse and holds the amplitude of the envelope peak at its sampled level. The signal is then sent to the low pass filter 44b to smooth the peak reference of the envelope of the signal and to eliminate noise spikes that may cause false time of arrival detections. The peak level device 44 is responsible for setting a threshold level and is instrumental in performing a signal detection technique called thresholding. During thresholding, the received signal is compared with the threshold level such that the arrival of the transmitted sound is acknowledged when the amplitude of the signal reaches or exceeds this level.

The analyzing means 30 further includes peak detection means 40 which detects the peak of the maximum amplitude of the envelope of the received signal. The peak occurs at a time known as the rough time of arrival (RTOA) and is used to generate a rough estimate of the TOF (RTOF). As seen in FIG. 3, peak detection means 40 consists of an envelope detector 50, a differentiator 52a, zero crossing detector 52b, and a peak indicator 54. The envelope detector 50 provides an envelope of the received signal, and differentiator 52a, zero crossing detector 52b and peak indicator 54 acknowledge the arrival of the signal when the maximum amplitude of the envelope is detected. Detection is dependent upon the shape of the envelope, not the absolute magnitude of the pulse, which means that the threshold level determined by peak level device 44 is adjustable. This signal detection technique is an extension of thresholding known as adjustable thresholding. After the maximum amplitude of the signal is detected, the threshold level or zero crossing level is determined by differentiator 52a. Differentiator 52a differentiates the detected envelope to turn the time of the maximum envelope amplitude into a time when zero crossing occurs. The zero crossing detector 52b effectively detects when the peak of the envelope occurs. After detection has occurred, the peak indicator 54 emits a pulse to the peak level device 44 and to the TOF generator 56 indicating that the TOA of the signal has been obtained.

The TOF generator 56 combines RTOA information with strobe 26 sent by strobe means 28 to generate RTOF measurements of the transmitted sound. The measured RTOF pulse is sent to summer 46 of the automatic gain controller 42 and is combined with the output of the peak level device 44 which is fed into variable gain amplifier 38 for continued signal processing and monitoring of the previously transmitted sound. This process continues until each receiver 14 is reset by a new sound transmission.

Figure 6A:
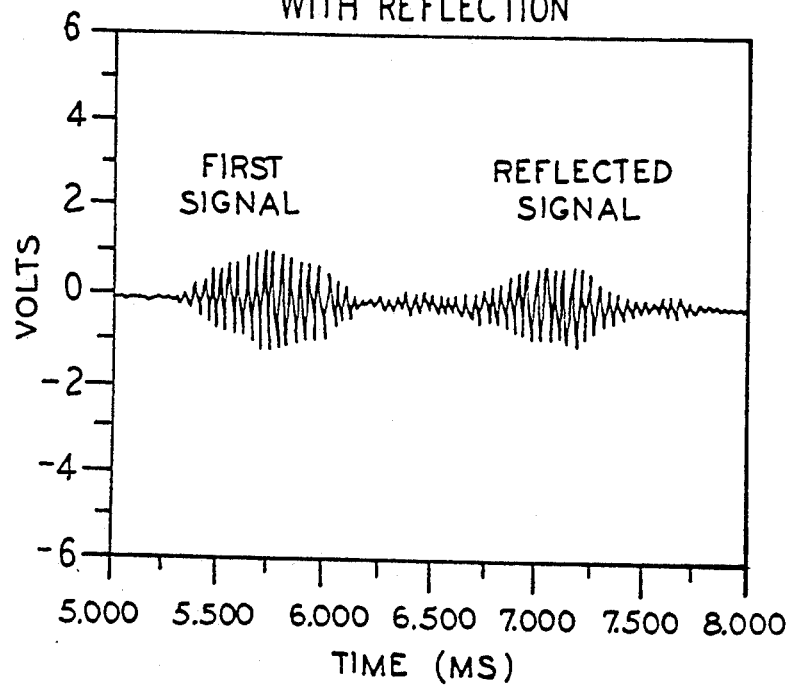
FIGS. 6A and 6B are illustrations of a received signal before and after reflection-rejection processing.
Figure 6B:
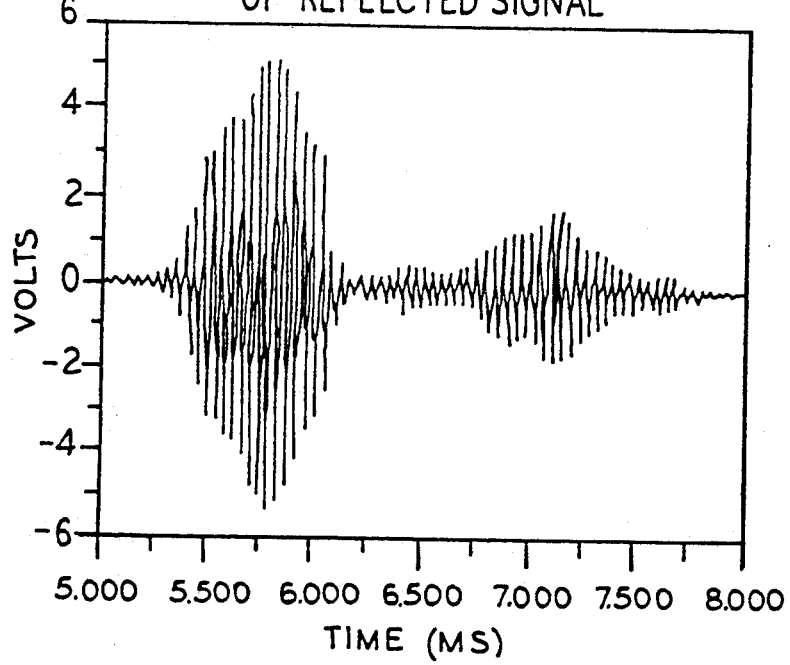

Another technique employed by the present system 10 in overcoming the problem of faulty signal detection is called signal reflection-rejection. Signal reflection-rejection is used to attenuate unwanted and reflected signals. The reflections of a sound wave before signal reflection-rejection and the effects after signal reflection-rejection technique is shown in FIGS. 6A and 6B. As seen, without signal reflection-rejection, reflected signals would be interpreted as additional receptions of different sound transmissions which would lead to faulty signal processing and erroneous location information.

Controlling means 32 also includes phase detection means 48 which is operably associated with the strobe 26 and each receiver of controlling means 32 to the relative phase displacement of the transmitted sound. The measured phase displacement is used to adjust the arrival time of the envelope peak, i.e., phase measurements are used to adjust the TOF within the cycle in which the peak is detected. In addition, TOF measurements and phase displacement measurements are combined to provide more accurate distance measurements.

Computing means 34 may be a 386 (MHz) IBM-compatible personal computer or the like equipped with an I/O card providing two 16-bit counters per receiver and additional I/O ports. The counter cards 58 and a 40kHz pulsed sync are used to synthesize the strobe 26. Counter cards 58 include a 5MHz crystal oscillator for providing the necessary stability in obtaining precise phase measurements. The precision of phase measurements is determined by the accuracy of the crystal oscillator used to create the transmitted signal and the accuracy of the phase measurement technique used. Crystal oscillators are adequate to create sufficiently accurate signals to drive the transmitter, or at least, they are adequate for periods of time many orders of magnitude longer than the time required to perform various ranging operations. Strobe 26 is used to initiate the transmission of a sinusoidal burst, and is combined with a rough time of arrival (RTOA) signal emitted by the peak indicator 54 to provide a rough time of flight (RTOF) signal which is read into a designated counter having 1MHz resolution. Computing means 34 also includes software modules 60 wherein monitoring, computing and generating of desired information are performed. The modules 60 consist of TOF monitor 62, phase monitor 64, strobe generator 66, sync generator 68, and a three dimensional position calculation device 70.

As will be shown below, receiver locations must be known to formulate a receiver location matrix A for finding the location of the point of interest 16. This is achieved during the installation or calibration process. However, the present system 10 can also be used to find the exact location of all of the receivers simultaneously.

Figure 7:
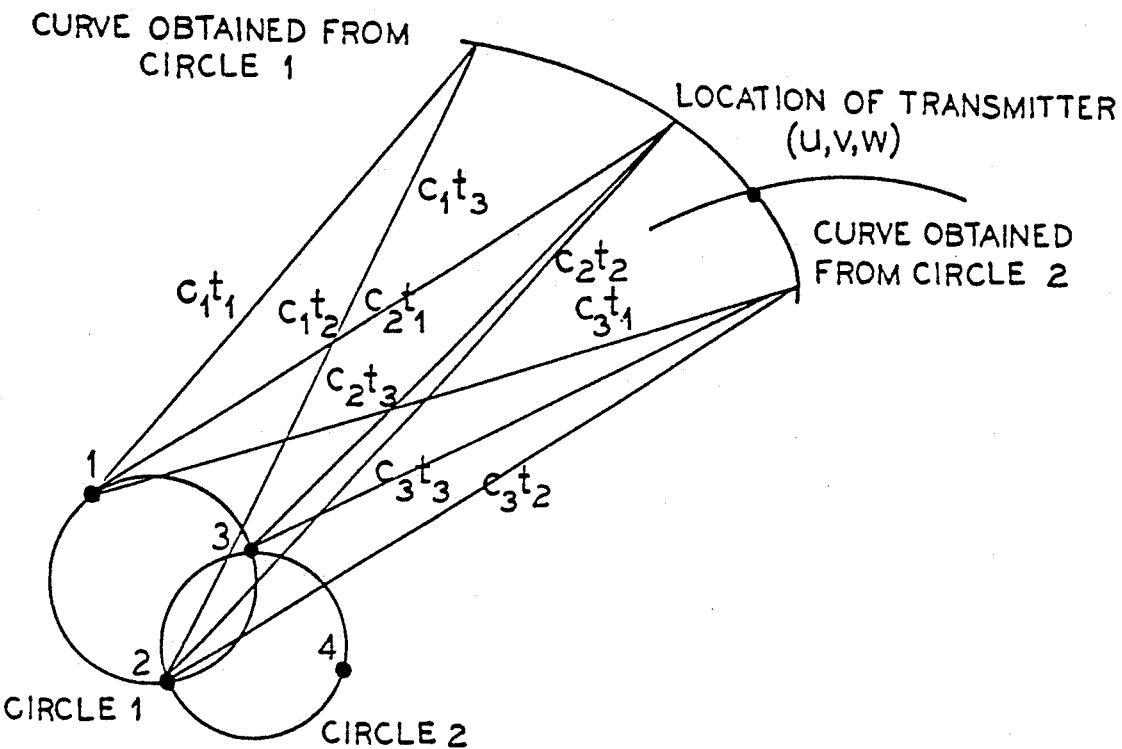
FIG. 7 shows the location of receivers on a plane for a non-singular matrix A.
Figure 8:
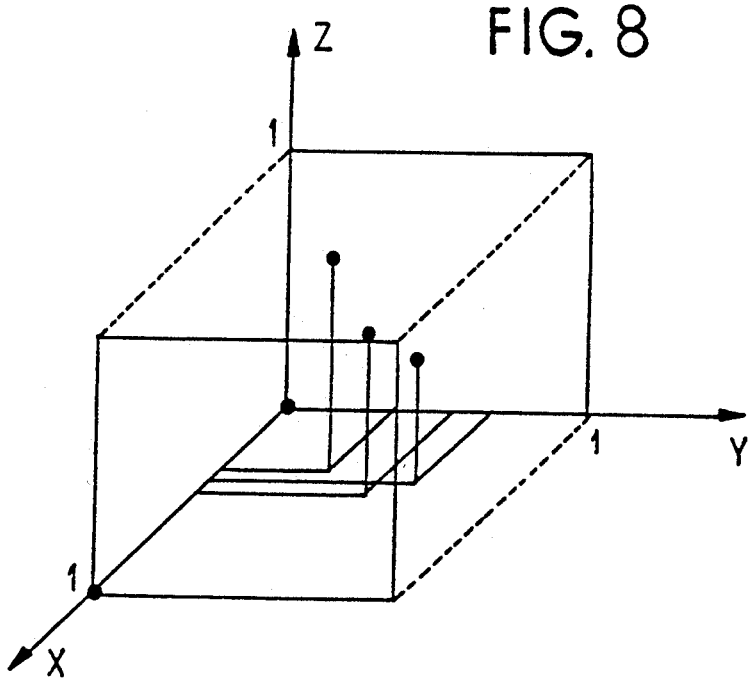
FIG. 8 shows an optimum receiver configuration in the present coordinate system.

The present invention performs a triangulation operation using linear matrix formulation to triangulate the location of the point of interest 16 after the sound has reached the receivers 14 fixed to the frame of reference. Triangulation operation calculates the position of a transmitter 12 by the intersection of spheres using time of flight information as seen in FIG. 7. The formulation uses a set of linear equations wherein each equation describes the distance obtained from TOF measurements between a receiver and the transmitter. Placing the transmitter at the coordinate (u,v,w) and placing the $i^{th}$ receiver at the coordinate $(x_i, y_i, z_i)$, the distance from the transmitter 12 to the receiver 14 is defined as $$l_i^2 = (x_i - u)^2 + (y_i - v)^2 + (z_i - w)^2 \quad (1)$$

Upon expanding the square terms and making the following substitutions $$p^2 = u^2 + v^2 + w^2 \quad (2)$$

$$r_i^2 = x_i^2 + y_i^2 + z_i^2 \quad (3)$$

$$l_i^2 = s^2(t_i - t_d)^2 \quad (4)$$

the following equation is obtained $$(t_i - t_d)^2 = \frac{r_i^2}{s^2} + \frac{p^2}{s^2} - \frac{2ux_i}{s^2} - \frac{2uy_i}{s^2} - \frac{2wz_i}{s^2} \quad (5)$$

where s is the speed of sound, and $t_i$ is the rough time of flight (RTOF) of the pulse emitted by the transmitter 12 (or adjusted by the phase for improved accuracy) and sensed by the receiver 14 and $t_i$ is a measurement vector representing the time of flight of the sound emitted by the transmitter and received by the corresponding receiver. Alternatively, $t_i$ can be the adjusted time of flight, using the measurement of phase for improved accuracy. Time delay $(t_d)$ is a constant delay term that incorporates delays from the electronic circuitry used to condition the sound at the receiver, delay inherent to the sound detection method to acknowledge reception of the sound at the receiver, and acusto-electromechanical delay associated with the transducers. The time delay $(t_d)$ can be measured experimentally using the system, and is assumed known for any given system.

Equation (5) can be applied to multiple receivers and further arranged to be used to determine the coordinates of the point of interest 16, and to install and calibrate the system. When used to determine the coordinates of the point of interest 16 with respect to the inertial frame of reference of the fixed receivers 14, RTOF measurements of a sound are taken as it travels from the transmitter 12 to each receiver 14. The minimum number of receivers to give a solution is five, but more may be used for higher accuracy, in which case a least square estimation is used. Equation (5) may be written in the following form to define matrix A $$\begin{vmatrix} (t_1 - t_d)^2 \\ (t_2 - t_d)^2 \\ \cdot \\ \cdot \\ \cdot \\ (t_n - t_d)^2 \end{vmatrix} \begin{vmatrix} 1 & r_1^2 & 2x_1 & 2y_1 & 2z_1 \\ 1 & r_2^2 & 2x_2 & 2y_2 & 2z_2 \\ & & \cdot & & \\ & & \cdot & & \\ & & \cdot & & \\ 1 & r_n^2 & 2x_n & 2y_n & 2z_n \end{vmatrix} \begin{vmatrix} \frac{p^2}{s^2} \\ \frac{1}{s^2} \\ \frac{-u}{s^2} \\ \frac{-v}{s^2} \\ \frac{-w}{s^2} \end{vmatrix} \quad (6)$$

The above matrix equation (6) can be written in the following vector form $$\mu = (A^T A)^{-1} A^T \overline{M} \quad (7)$$

where $\overline{M}$ is the measurement vector, A is the receiver location matrix, and $\mu$ is the unknown vector. If more than five receivers are present then the following least square estimate may be used $$\mu = (A^T A)^{-1} A^T \overline{M} \quad (8)$$

Equation (6) can be solved for the unknown vector on the right to obtain estimated values for the speed of sound s, the coordinates of the transmitter (u,v,w), and the sum of the squares of the coordinates of the transmitter $p^2$. The estimated values may be compared to the sum of the squares of the coordinates of the transmitter to verify the values obtained. Using the above formulation, the speed of sound is estimated at every ranging operation and is therefore continuously calibrated thereby eliminating the speed of sound as a variable thus minimizing errors due to fluctuations in the speed of sound.

It should be appreciated that equation (7) may be solved for $\mu$ only if matrix A has a rank of five, and when using five receivers if matrix A is non-singular, i.e., the determinant of A is non-zero when using five receivers. To ensure linear independence of the columns of matrix A in m-dimensional space and to avoid matrix A from becoming singular the following rules must be adhered to:

a) the minimum number of receivers used must be five;

b) any five receiver locations cannot be on the same plane;

c) four receiver locations may be on the same plane as long as the fourth point does not lie on the circle described by the first locations;

d) three of the four receiver locations may be collinear; and e) if the fourth point is not on the plane described by the first three points, then the fifth point cannot be on the sphere described by the first four points.

Before operation of the system 10, installation (or calibration) of the system must be performed in order to find the exact location of the receivers. Installation is performed by moving the transmitter to known coordinates of the inertial frame of reference and by measuring the TOF to each receiver. The minimum number of receivers required to eliminate the speed of sound as a variable is five but more receivers may be used in which case a least squares estimation is done. This procedure gives the location of all the receivers simultaneously and allows the user to place the receivers anywhere in the coordinate system.

By performing an installation operation, the receivers' coordinates are determined with the same degree of accuracy as the ultrasonic ranging system and of the motions of the transmitter during installation.

To install the present system, equation (5) may be written in the following matrix form which corresponds to k positions of the transmitter $$\begin{vmatrix} (t_1 - t_d)^2 \\ (t_2 - t_d)^2 \\ \cdot \\ \cdot \\ \cdot \\ (t_k - t_d)^2 \end{vmatrix} = \begin{vmatrix} 1 & p_1^2 & 2u_1 & 2v_1 & 2w_1 \\ 1 & p_2^2 & 2u_2 & 2v_2 & 2w_2 \\ & & \cdot \\ & & \cdot \\ & & \cdot \\ 1 & p_k^2 & 2u_k & 2v_k & 2w_k \end{vmatrix} \begin{vmatrix} \frac{r_i^2}{s^2} \\ \frac{1}{s^2} \\ \frac{-x_i}{s^2} \\ \frac{-y_i}{s^2} \\ \frac{-z_i}{s^2} \end{vmatrix} \quad (9)$$

wherein a measurement vector $(t_1, t_2, ..., t_k)$ represents the time of flight of the sound emitted by the transmitter 12 and received by the $r_i$ receiver and $t_d$ represents the time delay inherent in the system. $(u_1, v_1, w_1, ... u_k, v_k, w_k)$ represents the coordinates of the transmitter in three-dimensions. Vector $p^2$ represents $u^2 + v^2 + w^2$ which is a square of the coordinates of the transmitter 12, and vector $r^2$ represents $x^2 + y^2 + z^2$ which is a square of the coordinates of the receiver 14. Equation (9) may be written for each receiver located at $(x_i, y_i, w_i)$.

Equation (9) can be solved for the vector on the right, thus obtaining a measured value for the speed of sound s, the coordinates of the receiver $(x_i, y_i, z_i)$, and the sum of the squares of the coordinates of the receiver $r_i^2$, which may be used as a way to verify the measured values obtained above.

The present system may be modified for use with guidance of autonomous vehicles (AGVs) in a given work area. AGVs generally move in one plane, i.e., along the floor and therefore do not move in or normally allow for measurement in three dimensions, a modification to matrix equation (9) has been made so that no more than four AGV locations are required to solve the set of linear equations, and to give the location of the receivers in three dimensions. Referring to equation 5, w is set to zero since the transmitter 12 mounted on the AGV moves only in two dimensions. The modified equation is therefore $$(t_i - t_d)^2 = \frac{r_i^2}{s^2} + \frac{p^2}{s^2} - \frac{2ux_i}{s^2} - \frac{2vy_i}{s^2} \quad (10)$$

and the matrix formulation for use of the modified equation to perform installation or calibration is:

$$\begin{vmatrix} (t_1 - t_d)^2 \\ (t_2 - t_d)^2 \\ \cdot \\ \cdot \\ \cdot \\ (t_k - t_d)^2 \end{vmatrix} = \begin{vmatrix} 1 & p_1^2 & 2u_1 & 2v_1 \\ 1 & p_2^2 & 2u_2 & 2v_2 \\ & \cdot \\ & \cdot \\ & \cdot \\ 1 & p_k^2 & 2u_k & 2v_k \end{vmatrix} \begin{vmatrix} \frac{r_i^2}{s^2} \\ \frac{1}{s^2} \\ \frac{x_i}{s^2} \\ \frac{y_i}{s^2} \end{vmatrix} \quad (11)$$

where (u,v) are the positions of the transmitter 12 on one plane, i.e., w=0, and the coordinates of the receivers are (x,y,z,). The z coordinate of the receiver 14 is determined after calculating s, x and y using the following equation $$z_i = \sqrt{r_i^2 - x_i^2 - y_i^2} \quad (12)$$

The drawback in using the modified equation (11) is that no extra equation is available to use for verifying the values calculated. In other words, when equation (5) was used earlier, the value of $r_i^2$ was employed as a way to check the values obtained for x, y and x.

A method to determine the location of the receivers 12 on a plane for a non-singular matrix A within the coordinate system is also taught by the present invention. Referring to FIG. 7, any arbitrarily chosen non-collinear three points define a circle on a plane. It does not matter where these three points lie since the points always define a plane in the inertial frame of reference. Assuming that the points represent receiver locations and are on the plane z=0, and that the transmitter is located at (u,v,w), the location of the receiver can be found. Range measurements taken from the transmitter 12 to each of the three receivers 14 defines two points where the sphere's radii, which are proportional to their respective measured RTOF's, intersect. These points are mirror images of each other with respect to the plane containing the receivers. The distance from the transmitter 12 to each receiver is given by equation $$l_i = st_i \quad (13)$$

where $l_i$ is the distance from the transmitter 12 to the receiver 14, s is the speed of sound, and $t_i$ is the RTOF minus the time delay $t_d$. However, using only three receivers, the location of the transmitter 12 remains unknown.

As the RTOF's for each receiver 14 to the transmitter 12 is multiplied by the speed of sound s, a point representing the position of the transmitter is defined for each value of s. As shown in FIG. 7, by varying s, a number of points are obtained that define a curve obtained for circle 1 along which the transmitter 12 may be located. Adding additional receivers on the circle defined by the first three would not generate any new information regarding the speed of sound or produce the actual location of the transmitter; it would only generate additional points on the original curve. But, by placing the fourth receiver at a point such that it is on the same plane but not on circle 1, which is described by the first three points, another unique circle, circle 2, on the plane z=0 is defined.

Therefore, by varying s and using three receivers, curve 2 is generated along which the transmitter may lie. The intersection of curves 1 and 2 obtained from circles 1 and 2, respectively, defines two points, which are mirror images of each other and are located on either side of the plane z=o, that represent the location of the transmitter 12. Placing a fifth receiver 14 off the plane as described by the first four receivers 14 and once again using the above method defines a unique location for the transmitter. In addition, using the equation $l_i = st_i$ (13), the speed of sound can now be calculated.

An alternate configuration of the receivers to determine the location of the transmitter and to obtain range measurements by varying the speed of sound includes positioning the fourth point such that it is not positioned on the plane described by the first three points. This configuration defines a unique sphere. The fifth point should not be on this sphere since no new information would be generated. With the fifth point being off the sphere, it is taken in conjunction with any other three points to define a new sphere. This sphere generates a new curve on which the transmitter may be located and the intersection of the two curves pin-point the exact location of the transmitter and indirectly determine the speed of sound.

Even though a method has been disclosed for determining the positions of the receivers, a more precise method to determine receiver location or an optimum configuration for receiver location is also taught by the present invention. Unlike the previous discussions where the determining conditions used to chose receiver locations required that matrix A does not become singular, or maintains a full rank, the optimum configuration method yields a matrix A such that $\mu$'s projections onto the columns of A describe M with the best resolution possible. This method is disclosed under the general term Geometric Dilution of Precision (GDOP) in work related to the NAVSTAR Global Positioning System (GPS).

The columns of matrix A will be completely independent of each other if they are orthogonal to each other. However, obtaining an orthogonal base is not always feasible. Matrix equation (7)

$$\overline{M} = A\mu$$

where $\overline{M}$ is the measurement vector, A is the receiver location matrix, and $\mu$ is the unknown vector and the projection on the column space of matrix A, would be optimal if the projections of the columns on each other are the same and are minimum. This leads to the criterion that if the dot products of each two columns of A is the same, and is minimum, then the optimum receiver location configuration is obtained.

Letting the columns of the receiver location matrix A be denoted by vectors $V_1$, $V_2$, $V_3$, $V_4$ and $V_5$, the following equations are obtained to meet the criteria of optimality:

$$V_1 \cdot V_2 = V_1 \cdot V_3 = V_1 \cdot V_4 = V_1 \cdot V_5 = V_2 \cdot V_3 = V_2 \cdot V_4 = V_2 \cdot V_5 = V_3 \cdot V_4 = V_3 \cdot V_5 = V_4 \cdot V_5$$

From the above equations, nine independent equations can be obtained which have fifteen variables, i.e., x,y,z, in three dimensional space. For the five receiver locations, six of the variables can be defined. By choosing two arbitrary receiver positions in space, $V_1$ (0,0,0) and $V_2$ (1,0,0), and solving the nine equations numerically for $V_3, V_4$ and $V_5$, an optimum receiver configuration is obtained.

In the operation of the preferred embodiment, strobe means 28 of the system 10 generates a strobe 26 which is sent to signal generator 22. The strobe 26 causes a signal to be generated which is amplified by first amplifying means 20 which causes a sound to be transmitted by transmitter 12. The receivers 14 in the coordinate system receive the sound and the analyzing means 30 detects the reception of the transmitted sound. The detection method used is adjustable thresholding which is effectively a detection of the zero crossing of the derivative of the envelope of the received sound. When the maximum amplitude of the sound occurs, signal detection will occur and RTOA pulses are created. RTOA pulses are then combined with strobe 26 to generate RTOF pulses which are read into dedicated counter 52 for determining the position of the point of interest 16.

RTOF measurements are estimated for each receiver 14 according to the following equations:

$$t_i = n_i^* T \quad (15)$$

where: $t_i$ is the modified rough time of flight, T is the period of the transmitted sound, and $n_i$ is the integer number of periods T contained in the RTOF$i$.

In other words, using the following equation, RTOF and phase measurements yield TOF measurements where:

$$TOF = (t_i + \tau_{m,i}) - t_d \quad (16)$$

$\tau_{m,i}$ is the phase difference $t_d$ is the delay estimated for the system at the calibration stage. For example if $n_i = 10$, $\tau_{m,i} = 0.62$, $t_d = 0.1$ and $T = 1$ and using equation (15), $t_i$ would be equal to 10. Substituting 10 for $t_i$ into equation (16), TOF would be equal to 10.52.

The position of the point of interest is displayed on display means which is connected to analyzing means 30.

Thereafter, as in the case of a single sound transmission wherein reflected sounds are subsequently received, the feedback is raised to a value equal to the maximum amplitude of the last envelope detected of the sound plus five volts from the TOF generator. This effectively fools the variable gain amplifier into thinking that its output is too high and produces a large reduction in amplication, thus rejecting reflections. This is performed by the automatic gain controller 42.

As stated above, equation (15) is used to generate RTOF measurements which is equivalent to TOF measurements without fine tuning with the higher resolution phase measurement.

In an alternate embodiment of the present system, RTOF measurements are combined with phase measurements for more accurate and refined position information of a point of interest 16. A strobe 26 is sent to signal generator 22, for initiating a sinusoidal burst signal for generating a sound that is to be transmitted by transmitter 12. A strobe 26 is also sent to phase detection means 48 for comparing the sound received by receiver 14 with the sync pulse to generate phase measurements. Thereafter, the RTOF measurements, generated as above, and the phase measurements are sent to their respective dedicated counters 62 and 64 to calculate and refine position information of a point of interest 16.

The present system can also be adapted to measure the velocity of a point of interest in three dimensions. Using the system's phase measurement circuitry, a few of the wavelengths are gated in order to compare the sounds wavelengths with the wavelengths of the sync. The measured wavelengths of the received signal may be input into a designated counter to measure the frequency. Using this information, and the principle of the Doppler Shift, the velocity of the point of interest can be calculated as follows.

First, the coordinates of the transmitter (point of interest) are determined using the system. Let $\beta_i = (\mu_{xi}, \mu_{yi}, \mu_{zi})$ unit vector from the transmitter to receiver i, calculated from the positions of the transmitter and the receiver i.

$v_i = v \cdot \beta_i$ = velocity component of the transmitter along $\beta_i$ expanding the terms in the above equation, $$v_i = v_x \cdot \mu_{xi} + v_y \cdot \mu_{yi} + v_z \cdot \mu_{zi} \quad (14)$$

$v_i$ is measured by the Doppler Shift, $$v_i = s \cdot \frac{f_i - f}{f}$$

where s is the speed of sound, f is the frequency of the transmitted signal, and $f_i$ is the frequency measured at the receiver i.

Equation (14) may be written for three or more receivers, thus determining the three components of the velocity of the point of interest (transmitter). If more than three receivers are involved in this calculation, then a least squares estimate of the velocity is obtained.

Another embodiment of the present system includes determining the coordinates of multiple target points. This can be achieved using one of two methods. The first method can determine the coordinates of the multiple target points simultaneously. This method requires a transmitter to be attached to each target point. Each transmitter must have a different signal frequency than that of the others. This can be done with wide band receivers. Upon simultaneous excitation, the transmitter simultaneously transmits a sound in the coordinate system whereby the coordinates of each target point are simultaneously determined as previously described.

The second method determines the coordinates of each target point sequentially. As above, a transmitter is attached to each target point. However, because the signals from each transmitter are serially transmitted, there is no requirement that each transmitter have a different signal frequency.

The coordinates of each transmitter are sequentially determined using the system and methods described above.

What is claimed is:

1. A position detecting system for determining the coordinates of a point of interest in a m-dimensional coordinate system, comprising:
   a) a transmitter associated with the point of interest for the transmission of a sound in the coordinate system;
   b) a plurality of receivers each having a known location, the number of receivers being at least m plus two, for receiving the sound transmission;
   c) analyzing means operably associated with the receivers to generate measurements relating to the distances between the transmitter and each receiver and using such measurements to eliminate the speed of sound as a necessary variable, and to identify the location of the point of interest.

2. The system of claim 1 wherein the analyzing means includes a controlling means for generating time of flight measurements relating to the time between transmission of the sound and reception of the sound by the respective receivers indicative of the respective distances and computing means for processing the distance measurements to eliminate the speed of sound as a variable and computing the location of the point of interest.

3. The system of claim 1 wherein the analyzing means includes a plurality of controlling means each operably connected to the transmitter and respective receivers to generate the distance measurements and computing means operably connected to each controlling means for combining the distance measurements to eliminate the speed of sound as a variable and to compute the location of the point of interest.

4. The system of claim 1 further including strobe means operably connected to the transmitter and analyzing means for supplying the transmitter with a strobe to initiate the transmission of the sound and provide the analyzing means with an indication of when the sound is transmitted.

5. The system of claim 3 further including strobe means operably connected to the transmitter and each controlling means for supplying the transmitter with a strobe to initiate the transmission of the sound and provide each controlling means with an indication of when the sound is transmitted.

6. The system of claim 2 wherein the controlling means includes amplifiers connected to each receiver for processing and amplifying a signal generated by the receivers.

7. The system of claim 1 wherein the transmitted sound is a sinusoidal short duration signal generated by a strobe means.

8. The system of claim 2 wherein the analyzing means further includes phase detection means operably associated with the transmitter and receivers for measuring the relative phase displacement of the transmitted sound.

9. The system of claim 8 wherein the time of flight measurements and the phase displacement measurements are combined to provide the distance measurements.

10. The system of claim 1 further including display means connected to the analyzing means for displaying the position of the point of interest.

11. The system of claim 1 wherein the position of the point of interest is determined by a linear matrix formulation of a vector form.

$$\begin{vmatrix} (t_1 - t_d)^2 \\ (t_2 - t_d)^2 \\ \cdot \\ \cdot \\ \cdot \\ (t_n - t_d)^2 \end{vmatrix} = \begin{vmatrix} 1 & r_1^2 & 2x_1 & 2y_1 & 2z_1 \\ 1 & r_2^2 & 2x_2 & 2y_2 & 2z_2 \\ \cdot & & & & \\ \cdot & & & & \\ \cdot & & & & \\ 1 & r_n^2 & 2x_n & 2y_n & 2z_n \end{vmatrix} \begin{vmatrix} \frac{p^2}{s^2} \\ \frac{1}{s^2} \\ \frac{-u}{s^2} \\ \frac{-v}{s^2} \\ \frac{-w}{s^2} \end{vmatrix}$$

wherein a measurement vector $(t_1, t_2, ..., t_n)$ represents the time of flight of the sound emitted by the transmitter and received by $r_n$ receivers;

receiver location matrix $(x_1, y_1, z_1, ... x_n, y_n, z_n)$ represents the coordinates of the receiver in three-dimensions;

$(u, v, w)$ represents the coordinates of the transmitter in three-dimensions;

vector $p^2$ represents $u^2+v^2+w^2$ which is a square of the coordinates of the transmitter;

vector $r_i^2$ represents $x_i^2+y_i^2+z_i^2$ which is a square of the coordinates of the receiver; and $t_d$ represents a time delay inherent in the system so that the formulation is solved for the vectors $(u, v, w)$ and $p^2$ and $s^2$.

12. The system of claim 11 wherein the linear matrix formulation further includes comparing the solved for vectors to a sum of the coordinates of the transmitter as a check value.

13. A position detecting system for determining the coordinates of a point of interest in a m-dimensional coordinate system, comprising:

a) a transmitter mounted to the point of interest for transmitting a sound in the coordinate system;

b) a plurality of receivers, the number of receivers being at least m plus two for receiving the transmitted sound and producing a signal indicating the reception of the transmitted signal;

c) strobe means operably connected to the transmitter for supplying the transmitter with a strobe to initiate the transmission of the sound;

d) a plurality of controlling means equalling the number of receivers, the controlling means connected to the strobe means and respective receivers to process the signals and to generate measurements relating to a distance between the transmitter and each receiver; and e) computing means operably associated with each controlling means for using measurements of the distance between the transmitter and each receiver to eliminate speed of sound as a variable and compute a location of the point of interest.

14. The system of claim 13 wherein each controlling means generates time of flight measurements relating to the time between transmission of the sound and reception of the sound by the respective receivers indicative of the respective distances.

15. The system of claim 13 wherein each controlling means includes an amplifier connected to its respective receiver for processing and amplifying a signal generated by the receivers.

16. The system of claim 13 wherein each controlling means further includes phase detection means operably associated with the strobe and its respective receiver measuring the relative phase displacement of the transmitted sound.

17. The system of claim 16 wherein the time of flight measurements and the phase displacement measurements are combined to provide the distance measurements.

18. The system of claim 13 wherein each controlling means includes automatic gain control means for providing consistent sound quality in the transmitted sound received by the receiver;

peak detection means connected to automatic gain control means for detecting the peak of the amplified sound and determines a sound threshold level;

subsequent peak attenuation means connected to the peak detection means and the automatic gain control means for receiving and attenuating the detected peak sound and for supplying the automatic gain control means with an attenuated detected peak sound;

peak level means connected to the automatic gain control means and the peak detection means for maintaining the detected peak sound at a predetermined level and supplying the detected peak sound to the automatic gain control means; and reflection-rejection means for attenuating reflected sounds that may erroneously cause multiple computations from a single sound transmission.

19. A method for determining the coordinates of a point of interest in a m-dimensional coordinate system, comprising the steps of:

a. positioning a transmitter on the point of interest;

b. transmitting a sound pulse with the transmitter;

c. providing a plurality of stationary receivers, the number of receivers being m plus 2 for receiving the transmitted sound;

d. generating distance measurements from time of flight measurements relating to the time between transmission of the sound and reception of the sound by respective receivers; and e. computing the location of the point of interest eliminating speed of sound as a variable using the distance measurements.

20. The method of claim 19, further comprising the steps of:

a. defining initially the coordinates of a reference point of interest;

b. transmitting the sound pulse with the transmitter;

c. receiving the sound pulse with the receivers;

d. computing the location of the reference point of interest; and e. calibrating using the defined coordinates and the computed location.

21. The method of claim 19 further comprising the steps of:

a. measuring the relative phase displacements between the transmitter and each receiver; and b. combining the measurements of the phase displacements with respective measurements from the time of flight measurements to provide distance measurements between the transmitters and the receivers.

22. A method for determining the coordinates of a plurality of receivers in a m-dimensional coordinate system wherein the number of receivers being m plus 2, and using euation $$\overline{M} = A\mu$$

where $\overline{M}$ is the measurement vector, A is the receiver location matrix denote by vectors $V_1$, $V_2$, $V_3$, $V_4$ and $V_5$ and $\mu$ is the unknown vector and projection on the column space of the matrix A, comprising the steps of:

a. obtaining resultant vector dot product equations and variables from matrix A;

b. defining values for two vectors; and c. inserting those values into nine equations and solving the nine equations numerically for the remaining three vectors.

23. A method for determining the coordinates of n receivers during installation and calibration of the system by:

(a) placing the transmitter at k known locations;

(b) performing a ranging operation for each location; and (c) using the following equation for each receiver location $(x_i, y_i, z_i)$ to determine each receivers coordinates:

$$\begin{vmatrix} (t_1 - t_d)^2 \\ (t_2 - t_d)^2 \\ \cdot \\ \cdot \\ \cdot \\ (t_k - t_d)^2 \end{vmatrix} = \begin{vmatrix} 1 & p_1^2 & 2u_1 & 2v_1 & 2w_1 \\ 1 & p_2^2 & 2u_2 & 2v_2 & 2w_2 \\ & & \cdot \\ & & \cdot \\ & & \cdot \\ 1 & p_k^2 & 2u_k & 2v_k & 2w_k \end{vmatrix} \begin{vmatrix} \frac{r_i^2}{s^2} \\ \frac{1}{s^2} \\ \frac{-x_i}{s^2} \\ \frac{-y_i}{s^2} \\ \frac{-z_i}{s^2} \end{vmatrix}$$

wherein a measurement vector $(t_1, T_2, ..., t_k)$ represents a time of flight of the sound emitted by the transmitter and received by the $r_i$ receiver and $t_d$ represents a time delay inherent in the system; s represents the speed of sound; $(u_1, v_1, w_1, \ldots u_k, v_k, w_k)$ represents the coordinates of the transmitter in three-dimensions; vector $p^2$ represents $u^2+v^2+w^2$ which is a square of the coordinates of the transmitter, and vector $r^2$ represents $x^2+y^2+z^2$ which is a square of the coordinates of the receiver.

* * * * *

UNITED STATES PATENT AND TRADEMARK OFFICE
CERTIFICATE OF CORRECTION

PATENT NO. : 5,280,457
DATED : January 18, 1994
INVENTOR(S) : Jorge F. Figueroa and Enrique Barbieri It is certified that error appears in the above-indentified patent and that said Letters Patent is hereby corrected as shown below:

In the Abstract, line 2, change "m dimensional" to --m-dimensional--.

Column 8, line 17, change "$\mu = (A^T A)^{-1} A^T \overline{M}$" to --$\overline{M} = A\mu$--.

Column 11, line 35, change "M" to --$\overline{M}$--.

Column 13, line 14, change "Let ß=$\mu_1$," to --Let $\beta_1 = (\mu_1,$--.

Column 15, Claim 11, line 5, change "threedimen-" to --three-dimen--.

Column 16, Claim 22, line 59, change "denote" to --denoted--.

Column 18, Claim 23, line 15, change "($t_1$, $T_2$, ..., $t_k$)" to --($t_1$, $t_2$, ..., $t_k$)--.

Signed and Sealed this

Twenty-seventh Day of September, 1994

Attest:

BRUCE LEHMAN

*Attesting Officer*   *Commissioner of Patents and Trademarks*